J. A. MATHES.
EDUCATIONAL APPLIANCE.
APPLICATION FILED APR. 21, 1919.

1,375,308.

Patented Apr. 19, 1921.
2 SHEETS—SHEET 1.

Inventor
John A. Mathes

By Lyman E. Dodge
Attorney

J. A. MATHES.
EDUCATIONAL APPLIANCE.
APPLICATION FILED APR. 21, 1919.

1,375,308.

Patented Apr. 19, 1921.
2 SHEETS—SHEET 2.

Inventor
John A. Mathes
By
Lyman E. Dodge
Attorney

UNITED STATES PATENT OFFICE.

JOHN A. MATHES, OF SAN DIEGO, CALIFORNIA.

EDUCATIONAL APPLIANCE.

1,375,308.  Specification of Letters Patent.  Patented Apr. 19, 1921.

Application filed April 21, 1919. Serial No. 291,666.

*To all whom it may concern:*

Be it known that I, JOHN A. MATHES, a citizen of the United States, and a resident of the city of San Diego, in the county of San Diego and State of California, have invented a new and useful Educational Appliance, of which the following is a specification.

This invention relates to an educational appliance.

The principal object of this invention is the production of an educational appliance which will aid in firmly fixing certain information in the mind of a student and will facilitate his ready verification of the accuracy of his memory.

Other objects and advantages will appear as the description of the invention progresses, and the novel features of the invention will be particularly pointed out in the appended claims.

In describing the invention in detail, reference is had to the accompanying drawings, wherein I have illustrated a preferred physical embodiment of my invention, and wherein like characters of reference designate corresponding parts throughout the several views, and in which:—

Figure 1:
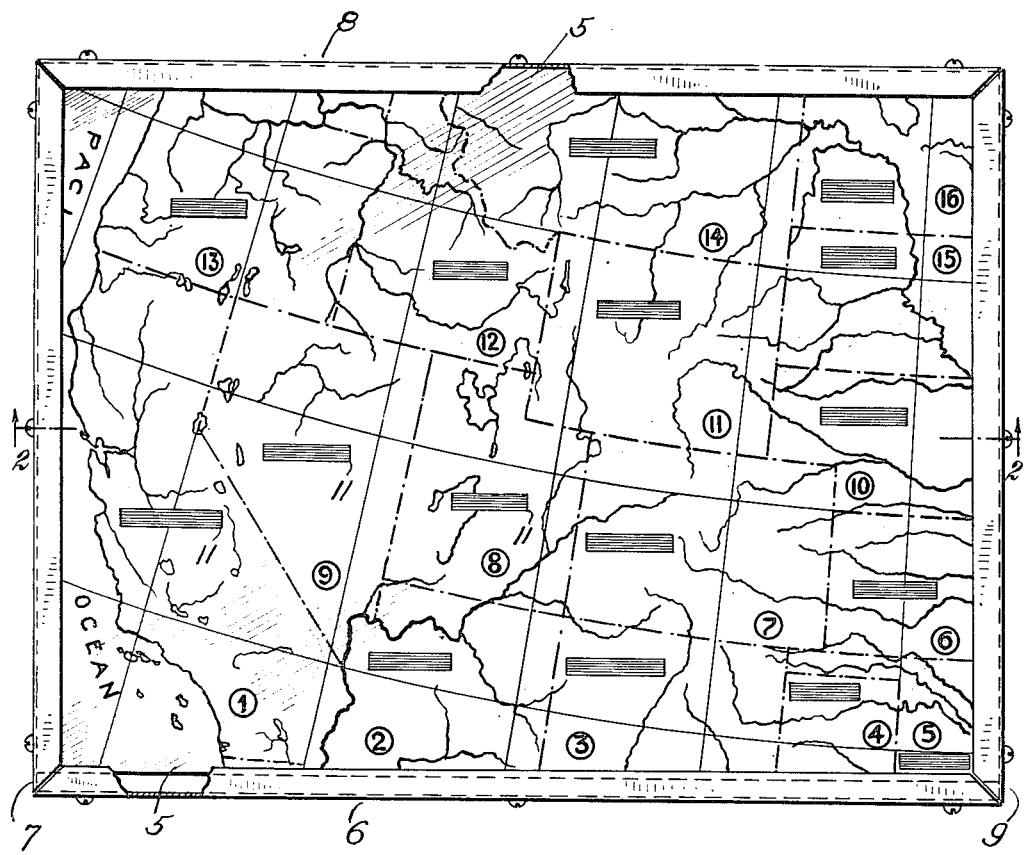
Figure 2:
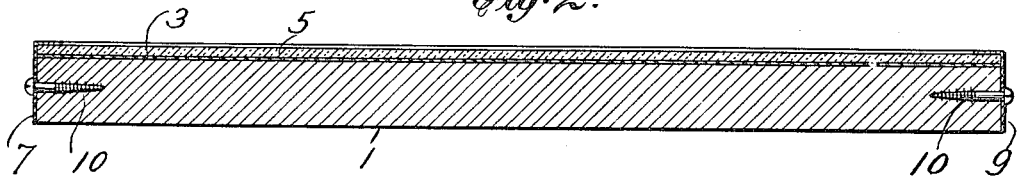
Figure 3:
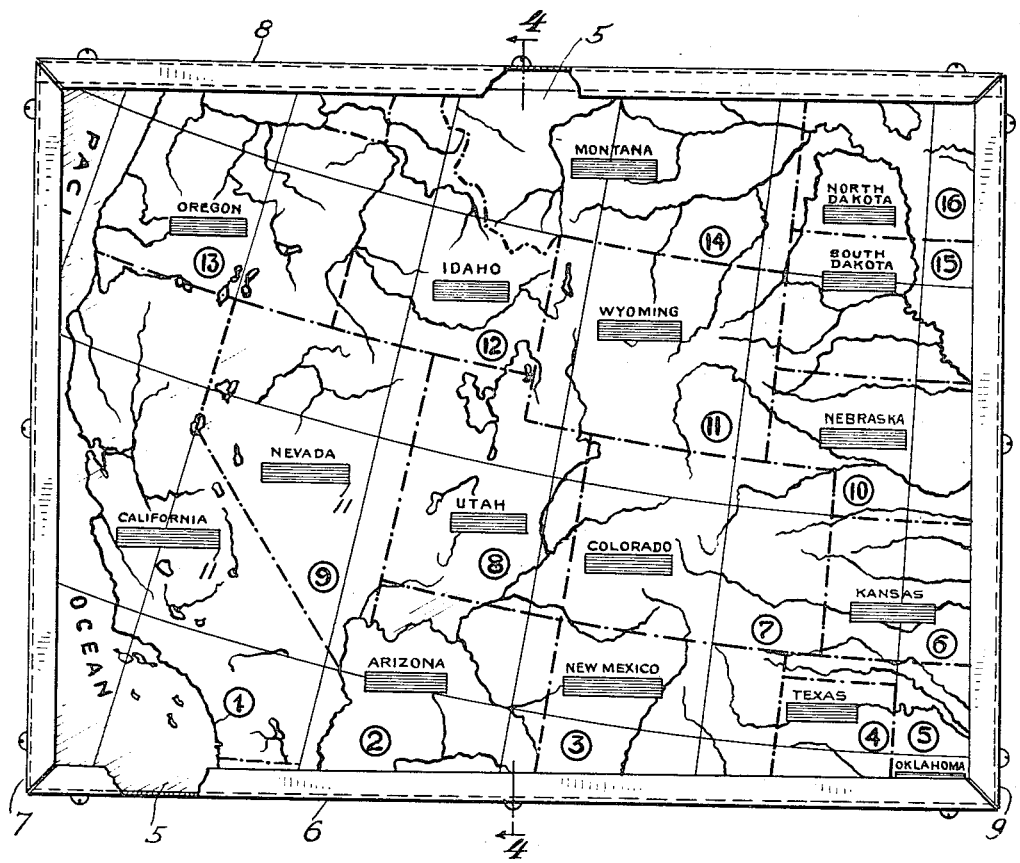
Figure 4:
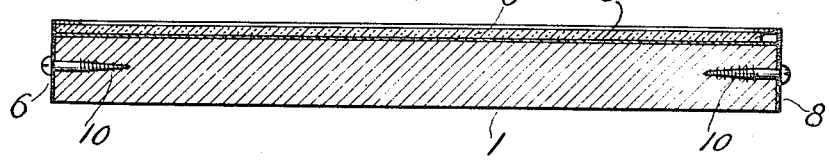
Figure 5:

Figure 1 is a top plan view of a device embodying my invention; Fig. 2 is a cross sectional view on the line 2—2 of Fig. 1; Fig. 3 is a top plan view of a device embodying my invention similar to Fig. 1, but with certain information which is obscured in Fig. 1, visible; Fig. 4, is a cross sectional view on line 4—4 of Fig. 3; Fig. 5, is a perspective view of an indicating tag which may be used with my invention.

Numeral 1 designates a mounting board or base of any suitable or appropriate material, preferably wood. The top of the base as shown in Figs. 2 and 4 bears certain information. This information may be of any desired kind and may be made to appear upon the top face of the base in any suitable or appropriate manner. I have shown the information as a chart, designated by 3 and shown in section in Figs. 2 and 4, of a certain portion of the United States with the names of States appearing thereon, best shown in Fig. 3. The boundaries of the States are outlined by dash and dot lines except where a river or other natural means forms part of the boundary, in which case the outline is formed of an irregular line, all of which accords with usual practice and is entirely familiar.

Above the information or chart on the top of the base I place the transparent member, 5, preferably made of glass and best shown in Figs. 2 and 4.

The transparent member is held in place by any suitable or appropriate means. In the drawings I have shown clips 6, 7, 8 and 9 attached to the sides of the base by means of screws 10 as a suitable construction. The clips are extended above the base a distance equal to the thickness of the transparent member 5 and also a distance equal to the thickness of a chart, 3, if the information on the top of base 1 is in the form of a chart and are then bent at right angles so as to extend over the top of the base and so hold the transparent member in place; in short are arranged suitably for their obvious purpose. By reference to Fig. 2 it will be seen that the transparent member 5 just fits between clips 7 and 9, but by reference to Fig. 4 it will be seen that the transparent member 5 is shorter than the distance between clips 6 and 8. This construction allows the transparent member 5 to be moved a limited distance northwardly and southwardly of the chart. When the transparent member is moved northwardly to the limit of its movement, as shown in Fig. 1, the names of the States are obscured by the means designated 11. This means preferably on the under side of the transparent member, may be frosting of the glass as by sand blasting or strips of opaque material affixed preferably to the under side of the transparent member 5. Any means in fact which renders the transparent member opaque at the desired places, that is over the names of the States when the transparent member 5 is moved to the limit of its movement northwardly, and allows the names of the States to appear when the transparent member 5 is moved to the limit of its movement southwardly as shown in Fig. 3.

The method of using the device as an educational appliance is as follows: A student is handed the device in the condition as shown by Fig. 3 or any chart of the United States and is instructed to become familiar with the names of the States and their general outline to such a degree that he could recognize any State by its outline. After the student is considered to have acquired the desired knowledge the transparent member 5 is moved northwardly as shown by Fig. 1 so that the names of the States are obscured. In order to fix the names firmly in the mind of the student and test the accuracy of his memory, he is then asked to state the name of some particular State. In order to facilitate this questioning any desired means, as indicia, may be used but I have indicated a number inclosed in a circle on each State. After the answer is given the transparent member is moved southwardly and the student given an opportunity to immediately see whether his answer was correct, thus having a decided tonic effect on the mind of the student.

If desired a student may be asked to place the name of any particular State or the names of several States on the transparent member 5 above the proper places. After the names, indicated on a tag, preferably metal, as shown by Fig. 5, and designated 12, have all been placed, then the transparent member 5 is moved southwardly, as shown in Fig. 3, and the accuracy may be immediately ascertained.

Many other methods of using the device will occur to the skilled educator but which it will be unnecessary to attempt to describe.

Although I have described my invention in connection with a geographical chart, I desire to have it understood that geological, astronomical, anatomical, historical, biographical and other like charts and lists are not intended to be excluded from the domain of my invention.

Although I have particularly described the construction of one physical embodiment of my invention, and explained the operation and principle thereof, nevertheless, I desire to have it understood that the form selected is merely illustrative, but does not exhaust the possible physical embodiments of the idea of means underlying my invention.

What I claim as new and desire to secure by Letters Patent of the United States, is:

1. In an educational device, in combination: a single chart having appearing thereon the answers to possible questions; means for obscuring the answers only; means for manually indicating the answers while the answers are obscured.

2. In an educational device, in combination: a single chart having appearing thereon the answers to possible questions; means for obscuring the answers only; means for manually indicating the answers while the answers are obscured, and means for exhibiting the obscured answers without disturbing the manually indicated answers.

3. In an educational device, in combination: a base; a chart mounted on the base; a transparent member having opaque portions over the chart, said transparent member being equal in length but less in width than the base by a distance approximately slightly greater than the width of an opaque portion; clips fastened to the sides and ends of the base and extending over the top thereof for holding, guiding and limiting the movement of the transparent member and said chart having certain information obscured by said opaque portions in one position of the transparent member but visible in another position of the transparent member.

4. In an educational device, in combination: a base; a chart mounted on the base; a transparent member having opaque portions over the chart, said transparent member being equal in length but less in width than the base by a distance approximately slightly greater than the width of an opaque portion; clips fastened to the sides and ends of the base and extending over the top thereof for holding, guiding and limiting the movement of the transparent member and said chart having certain information obscured by said opaque portions in one position of the transparent member but visible in another position of the opaque member, and a tag bearing information supposed to correspond with the obscured information for placing on the transparent member when the information on the chart is obscured.

JOHN A. MATHES.